(12) United States Patent
Ji et al.

(10) Patent No.: US 9,584,463 B2
(45) Date of Patent: Feb. 28, 2017

(54) METHOD AND APPARATUS FOR DISPLAYING ABSTRACT INFORMATION CORRESPONDING TO LINK

(71) Applicant: TENCENT TECHNOLOGY (SHENZHEN) COMPANY LIMITED, Guangdong (CN)

(72) Inventors: Mingzhong Ji, Guangdong (CN); Zaimao Ding, Guangdong (CN); Hongwei Li, Guangdong (CN); Mengwei Lv, Guangdong (CN); Yuhui Zhang, Guangdong (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 356 days.

(21) Appl. No.: 14/256,290

(22) Filed: Apr. 18, 2014

(65) Prior Publication Data

US 2014/0317207 A1    Oct. 23, 2014

Related U.S. Application Data

(63) Continuation of application No. PCT/CN2012/076730, filed on Jun. 11, 2012.

(30) Foreign Application Priority Data

Oct. 19, 2011   (CN) .......................... 2011 1 0319826

(51) Int. Cl.
*G06F 15/16* (2006.01)
*H04L 12/58* (2006.01)

(52) U.S. Cl.
CPC ............ *H04L 51/32* (2013.01); *H04L 51/046* (2013.01)

(58) Field of Classification Search
CPC ........ H04L 51/32; H04L 51/046; H04L 12/58
See application file for complete search history.

(56) References Cited

U.S. PATENT DOCUMENTS

| | | | | |
|---|---|---|---|---|
| 7,814,425 | B1 * | 10/2010 | O'Shaugnessy | G06Q 10/107 715/752 |
| 2003/0041092 | A1 * | 2/2003 | Woo | G06Q 10/107 709/200 |

(Continued)

FOREIGN PATENT DOCUMENTS

| | | |
|---|---|---|
| CN | 101102255 A | 1/2008 |
| CN | 102088466 A | 6/2011 |
| CN | 102098234 A | 6/2011 |

OTHER PUBLICATIONS

International Preliminary Report on Patentability and Written Opinion of the International Searching Authority for International Application No. PCT/CN2012/076730, issued on Apr. 22, 2014, in 10 pages.

(Continued)

*Primary Examiner* — Cheikh Ndiaye
(74) *Attorney, Agent, or Firm* — Knobbe Martens Olson & Bear LLP

(57) ABSTRACT

The present disclosure discloses a method and apparatus for displaying link abstract information. The method includes: downloading content corresponding to a Uniform/Universal Resource Locator (URL) from Internet according to the URL inputted by a user in a dialog window of an Instant Messaging (IM) client; analyzing the downloaded content, acquiring abstract information corresponding to the URL; displaying the abstract information in the dialog window. According to the above technical solution, the abstract information corresponding to a link inputted in a window of the IM software by the user can be displayed and conve- (Continued)

niently shared to the SNS community, so as to extend a function of the IM software and improve user experience.

3 Claims, 1 Drawing Sheet

(56) References Cited

U.S. PATENT DOCUMENTS

| | | | | |
|---|---|---|---|---|
| 2008/0201437 A1* | 8/2008 | Ludwig | .................. | H04L 51/04 |
| | | | | 709/206 |
| 2009/0307325 A1* | 12/2009 | Szeto | ..................... | G06Q 10/10 |
| | | | | 709/206 |
| 2010/0064018 A1* | 3/2010 | Luo | .................. | G06F 17/30905 |
| | | | | 709/206 |
| 2010/0070899 A1* | 3/2010 | Hunt | ................. | G06F 17/30861 |
| | | | | 715/769 |
| 2012/0072855 A1* | 3/2012 | Baldwin | ................ | G06Q 10/10 |
| | | | | 715/752 |

OTHER PUBLICATIONS

Extended European Search Report for European Patent Application No. 12840938.0, dated Aug. 22, 2014, in 8 pages.
International Search Report for PCT/CN2012/076730 mailed on Aug. 9, 2012, 2 pages.

* cited by examiner

METHOD AND APPARATUS FOR DISPLAYING ABSTRACT INFORMATION CORRESPONDING TO LINK

FIELD OF THE INVENTION

The present disclosure relates to a network communication technical field, and more particularly, to a method and apparatus for displaying abstract information corresponding to a link.

BACKGROUND OF THE INVENTION

At present, in instant messaging (IM) software, abstract information that can be displayed is exclusive information. For example, when a link of a product is inputted in Taobao Wangwang, information related with the product can be displayed. When a Paipai link of a product is inputted in Tencent QQ, information of the produce in Paipai is displayed.

However, in a conventional technical solution, abstract information among different IM software cannot be used universally. Moreover, if Uniform/Universal Resource Locators (URL) in other software are inputted in software, the abstract information cannot be displayed. If a specific link in Taobao Wangwang or URLs in other software are inputted in QQ, the abstract information cannot be displayed. Furthermore, in the conventional technical solution, after the abstract information is displayed in an IM window, a function of conveniently sharing the abstract information in a Social Networking Services (SNS) community is not provided to a user. Thus, function extension of the IM software is affected, and user experience is reduced.

SUMMARY OF THE INVENTION

An intention of the present disclosure is to provide a method and apparatus for displaying abstract information corresponding to a link, which can display abstract information corresponding to a link inputted in a window of IM software by a user.

The intention of the present disclosure may be implemented through the following technical solution:

A method for displaying abstract information corresponding to a link is provided in the present disclosure, which includes:

downloading, by a server, content corresponding to a Uniform/Universal Resource Locator (URL) from Internet according to the URL inputted by a user in a dialogue window of an Instant Messaging (IM) client;

analyzing, by the server, the downloaded content, acquiring abstract information corresponding to the URL, transmitting the abstract information to the IM client;

displaying, by the IM client, the abstract information in the dialogue window.

In the above solution, when the IM client displays the abstract information in the dialogue window, sharing, by the server, the content corresponding to the URL in a Social Networking Services (SNS) community designated by the user according to a request initiated by the user.

In the above solution, sharing, by the server, the content corresponding to the URL to the SNS community designated by the user according to the request initiated by the user includes: triggering, by the IM client, the server to search out an address of the SNS community designated by the user when the user clicks a sharing button or a sharing link configured in the dialogue window of the IM client; showing, by the server, the content corresponding to the URL in a sharing interface of the SNS community after a login interface of the SNS community is jumped to from a user interface and the user logs in normally.

In the above solution, the abstract information includes at least one as follows: a title corresponding to the URL, abstract corresponding to the URL, image related with the content corresponding to the URL, video link information corresponding to the URL.

An apparatus for displaying abstract information corresponding to a link is provided in the present disclosure, which includes:

a content downloading module, configured at a server, to download content corresponding to a Uniform/Universal Resource Locator (URL) from Internet according to the URL inputted by a user in a dialogue window of an Instant Messaging (IM) client;

an abstract information acquiring module, configured at the server, to analyze the content downloaded by the content downloading module, acquire the abstract information corresponding to the URL, transmit the abstract information to the IM client; and an abstract information displaying module, configured in the IM client, to display the abstract information in dialogue window.

In the above solution, the apparatus further includes: a content sharing module, configured at the server, to share the content corresponding to the URL in a Social Networking Services (SNS) community designated by the user according to a request initiated by the user.

In the present disclosure, firstly, content corresponding to a URL is downloaded from Internet according to the URL inputted by a user in a window of IM software. Afterwards, the downloaded content is analyzed. Abstract information corresponding to the URL is acquired. At last, the abstract information is displayed in the window of the IM software. Thus, the abstract information corresponding to the link inputted in the window of IM software by the user can be displayed. In addition, the abstract information can be shared in the SNS community conveniently, so as to extend the function of the IM software and improve user experience.

BRIEF DESCRIPTION OF DRAWINGS

In order to clearly describe the technical solution of examples of the present disclosure, drawings to be used for describing the examples are briefly illustrated. Obviously, the drawings described as follows are only in accordance with some examples of the present disclosure. For persons having ordinary skill in the art, other drawings can be acquired according to these drawings without creative efforts.

DETAILED DESCRIPTION OF THE INVENTION

A technical solution according to examples of the present disclosure will be illustrated clearly and completely hereinafter with reference to the accompanying drawings in the examples of the present disclosure. Obviously, the described examples are only partial examples of the present disclosure, but are not all examples. The present disclosure may be represented as different forms, and thus is not limited to the described examples. According to the examples of the present disclosure, those skilled in the art can obtain other examples without creative labor, which belong to the protection scope of the present disclosure.

Figure 1:
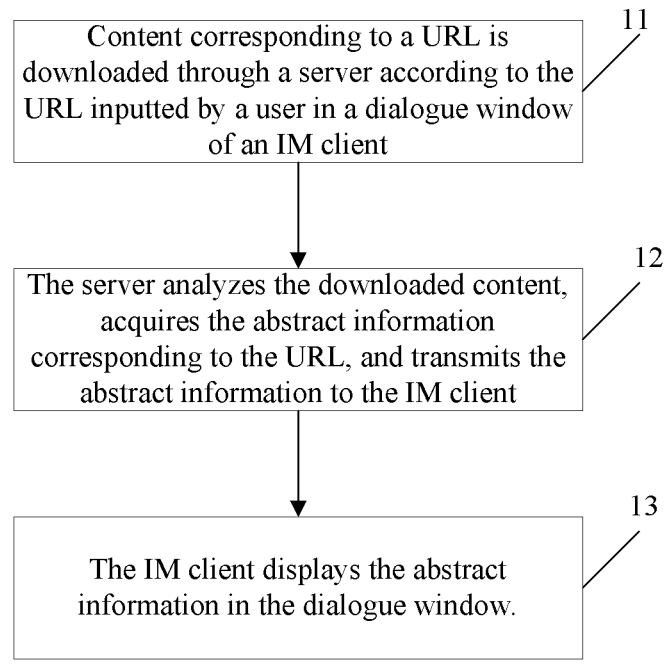
FIG. 1 is a flowchart illustrating a method for displaying abstract information corresponding to a link in accordance with an example of the present disclosure.

FIG. 1 is a flowchart illustrating a method for displaying abstract information of a link in accordance with an example of the present disclosure. As shown in FIG. 1, the method includes as follows.

At block 11, content corresponding to a URL is downloaded through a server according to the URL inputted by a user in a dialogue window of an IM client.

At the block, firstly the user inputs the URL in the dialogue window of the IM client. Afterwards, the content corresponding to the URL is downloaded through the server. In detail, the IM client may transmit the URL to the server. Afterwards, the server downloads the corresponding content from Internet according to the URL.

The above URL is also referred to as a webpage address, which is a standard resource address in Internet.

At block 12, the server analyzes the downloaded content, acquires the abstract information corresponding to the URL, and transmits the abstract information to the IM client.

At the block, the server analyzes the downloaded content, acquires the abstract information corresponding to the URL. The abstract information includes at least one as follows: a title corresponding to the URL, abstract corresponding to the URL, image related with the content corresponding to the URL, video link information corresponding to the URL and so on.

At block 13, the IM client displays the abstract information in the dialogue window.

At the block, after the abstract information corresponding to the URL is acquired, the abstract may be displayed in a window of IM software, so that the user can search conveniently and a next operation request of the user is accepted.

In addition, when the abstract information is displayed in the window of the IM software, the content corresponding to the URL may also be shared in a SNS community designated by the user, to further extend a function of the IM software.

In detail, a sharing button or a sharing link is added to the dialogue window of the IM client. When the user clicks the sharing button or the sharing link, the IM client triggers the server to search out an address of the SNS community designated by the user. After a login interface of the SNS community is jumped to from a user interface and the user logs in normally, the content corresponding to the URL is showed in a sharing interface of the SNS community by the server.

The above IM software may include: Tencent QQ, Ali Wangwang, MSN or Fetion. In additional, other IM software may implement the above method.

Figure 2:
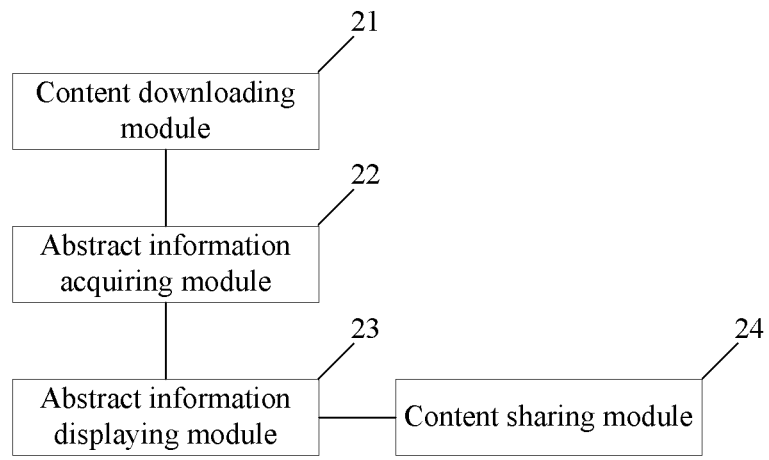
FIG. 2 is a schematic diagram illustrating a structure of an apparatus for displaying abstract information corresponding to a link in accordance with an example of the present disclosure.

An apparatus for displaying abstract information corresponding to a link is provided according to an example of the present disclosure. FIG. 2 is a schematic diagram illustrating a structure of the apparatus. In an example, the apparatus may be implemented through a server, which includes:

a content downloading module 21, configured at a server, to download content corresponding to a Uniform/Universal Resource Locator (URL) from Internet according to the URL inputted by a user in a dialogue window of an Instant Messaging (IM) client, detail implementation refers to the above example;

an abstract information acquiring module 22, configured at the server, to analyze the content downloaded by the content downloading module 21, acquire the abstract information corresponding to the URL, transmit the abstract information to the IM client, detail implementation refers to the above example;

an abstract information displaying module 23, configured in the IM client, to display the abstract information transmitted by the abstract information acquiring module 22 in dialogue window, detail implementation refers to the above example.

In addition, the above apparatus may further include:

a content sharing module 24, configured at the server, to according to a request initiated by the user, share the content corresponding to the URL in a SNS community designated by the user, e.g. QQ Space, Tencent Microblog and so on. Detail implementation refers to the above example.

It can be seen from above that according to the above technical solution, the abstract information corresponding to a link inputted in a window of the IM software by the user can be displayed and conveniently shared to the SNS community, so as to extend a function of the IM software and improve user experience.

The above examples can be implemented by hardware, software or a combination thereof. For example the various methods, processes and functional modules described herein may be implemented by a processor (the term processor is to be interpreted broadly to include a CPU, processing unit, ASIC, logic unit, or programmable gate array etc.). The processes, methods and functional modules may all be performed by a single processor or split between several processors; reference in this disclosure or the claims to a 'processor' should thus be interpreted to mean 'one or more processors'. The processes, methods and functional modules be implemented as machine readable instructions executable by one or more processors, hardware logic circuitry of the one or more processors or a combination thereof. Further the teachings herein may be implemented in the form of a software product. The computer software product is stored in a storage medium and comprises a plurality of instructions for making a computer device (which can be a personal computer, a server or a network device such as a router, switch, access point etc.) implement the method recited in the examples of the present disclosure.

The foregoing is only preferred examples of the present disclosure, and the protection scope of the present disclosure is not limited to this. Any improvement and replacement which can be made in the technical scope disclosed by the present disclosure by those skilled in the art should be covered in the protection scope of the disclosure. And thus, the protection scope of the present disclosure should be defined by the claims.

The invention claimed is:

1. A method for displaying link abstract information, comprising:
receiving, by a server, a dedicated Uniform/Universal Resource Locator (URL) for a first Instant Messaging (IM) software, the dedicated Uniform/Universal Resource Locator (URL) inputted by a user in a dialogue window of an IM client for a second IM software, the first IM software being different from the second IM software;
downloading, by the server, content corresponding to the URL for the first IM client software;
analyzing, by the server, the downloaded content to acquire abstract information corresponding to the URL, transmitting the abstract information to the IM client for the second IM software to be displayed in the dialogue window;

triggering, by the IM client for the second IM software, the server to search out an address of a Social Networking Services (SNS) community designated by the user when the user clicks a sharing button or a sharing link configured in the dialogue window of the IM client for the second IM software; and showing, by the server, the content corresponding to the URL in a sharing interface of the SNS community after a login interface of the SNS community is jumped to from a user interface and the user logs in.

2. The method according to claim 1, wherein the abstract information includes one or more of a title corresponding to the URL, abstract corresponding to the URL, image associated with the content corresponding to the URL, video link information corresponding to the URL.

3. A server, comprising:

a processor and a memory, wherein the processor executes instructions stored in the memory that cause the processor to:

receive a dedicated Uniform/Universal Resource Locator (URL) for a first Instant Messaging (IM) software, the dedicated Uniform/Universal Resource Locator (URL) inputted by a user in a dialogue window of an IM client for a second IM software, the first IM software being different from the second IM software;

download content corresponding to the URL for the first IM client software;

analyze the content downloaded, to acquire abstract information corresponding to the URL, transmit the abstract information to the IM client for the second IM software to be displayed in dialogue window;

search out an address of a Social Networking Services (SNS) community designated by the user when the server is triggered by the IM client for the second IM software when the user clicks a sharing button or a sharing link configured in the dialogue window of the IM client for the second IM software; and show the content corresponding to the URL in a sharing interface of the SNS community after a login interface of the SNS community is jumped to from a user interface and the user logs in.

* * * * *